United States Patent
Park et al.

(10) Patent No.: US 8,488,543 B2
(45) Date of Patent: Jul. 16, 2013

(54) METHOD OF PAGING USING HEADER

(75) Inventors: Gi Won Park, Gyeonggi-do (KR); Ki Seon Ryu, Gyeonggi-do (KR); Yong Ho Kim, Gyeonggi-do (KR); Young Soo Yuk, Gyeonngi-do (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/988,788

(22) PCT Filed: May 8, 2009

(86) PCT No.: PCT/KR2009/002429
§ 371 (c)(1),
(2), (4) Date: Oct. 20, 2010

(87) PCT Pub. No.: WO2009/136758
PCT Pub. Date: Nov. 12, 2009

(65) Prior Publication Data
US 2011/0032899 A1      Feb. 10, 2011

Related U.S. Application Data

(60) Provisional application No. 61/055,443, filed on May 22, 2008, provisional application No. 61/051,356, filed on May 8, 2008.

(30) Foreign Application Priority Data

Jul. 11, 2008  (KR) .................. 10-2008-0067502
Aug. 14, 2008  (KR) .................. 10-2008-0080136
Oct. 15, 2008  (KR) .................. 10-2008-0101349

(51) Int. Cl.
*H04W 4/00*     (2009.01)

(52) U.S. Cl.
USPC ........................ 370/329; 455/458; 455/515

(58) Field of Classification Search
None
See application file for complete search history.

(56) References Cited

U.S. PATENT DOCUMENTS

| | | | |
|---|---|---|---|
| 2005/0277429 A1 | 12/2005 | Laroia et al. | |
| 2006/0089161 A1* | 4/2006 | Kim et al. | 455/458 |
| 2008/0188247 A1* | 8/2008 | Worrall | 455/458 |
| 2008/0274751 A1* | 11/2008 | Tinnakornsrisuphap et al. | 455/456.1 |
| 2009/0285267 A1* | 11/2009 | Sarkar et al. | 375/147 |

OTHER PUBLICATIONS

Park, G., et al., "IEEE 802.16m Hierarchical Paging Operation for Efficient Power Management," IEEE 802.16 Broadband Wireless Access Working Group, IEEE 802.16m_08/777, Jul. 7, 2008.
Szalay, M., et al., "Hierarchical Paging—Efficient Location Management," Proceedings of the Fourth European Conference on Universal Multiservice Networks, pp. 301-310, Feb. 2007.
Ramjee, R., et al., "IP Paging Service for Mobile Hosts," Wireless Networks, vol. 8, No. 5, pp. 427-441, Sep. 2002.

* cited by examiner

*Primary Examiner* — Min Jung
(74) *Attorney, Agent, or Firm* — Lee, Hong, Degerman, Kang & Waimey

(57) ABSTRACT

A method for paging in a wireless access system is disclosed. A method for efficiently paging a mobile station of an idle mode comprises allocating an identifier of a large paging group and an identifier of a specific one of small paging groups included in the large paging group to a broadcast channel region and transmitting a header including the broadcast channel region to the terminal. Accordingly, the present invention enables efficient paging.

20 Claims, 9 Drawing Sheets

METHOD OF PAGING USING HEADER

CROSS-REFERENCE TO RELATED APPLICATIONS

This application is the National Stage filing under 35 U.S.C. 371 of International Application No. PCT/KR2009/002429, filed on May 8, 2009, which claims the benefit of earlier filing date and right of priority to Korean Application Nos. 10-2008-0101349, filed Oct. 15, 2008, 10-2008-0080136, filed on Aug. 14, 2008, and 10-2008-0067502, filed on Jul. 11, 2008, and also claims the benefit of U.S. Provisional Application Ser. Nos. 61/055,443, filed on May 22, 2008, and 61/051,356, filed on May 8, 2008, the contents of which are all incorporated by reference herein in their entireties.

TECHNICAL FIELD

The present invention relates to a wireless access system, and more particularly, to a paging method.

BACKGROUND ART

In the following description, a generally used paging group and an idle mode of a terminal are schematically explained.

FIG. 1 is a diagram for an example of a paging group consisting of a plurality of base stations.

Referring to FIG. 1, a plurality of base stations (BS) supporting an idle mode belong to a paging group to construct a paging area.

In this case, the paging group indicates a logical group. If there is a traffic that targets a mobile station (MS), the object of the paging group is to provide a neighbor range area that can be paged in downlink (DL). And, the paging group should meet the condition to be large enough for a specific terminal to exist for most of time within a same paging group and the condition to be small enough for a paging load to maintain a proper level.

FIG. 1 shows four paging groups defined on multiple base stations located at hexagonal lattices. One base station is able to be included in one or more paging groups. The paging group is defined by a management system. And, a paging group is able to use a paging group-action backbone network message. Moreover, a list of terminal in idle mode is managed using a paging-announce message corresponding to one of backbone network messages and initial paging of all base stations belonging to a paging group can be managed.

Idle mode indicates an operation of supporting a terminal to periodically receive a downlink (DL) broadcast traffic transmission without registering at a specific base station when the terminal is moving in a wireless link environment constructed with multiple base stations.

Idle mode is able to give the benefit to a terminal by eliminating a handover-related activation requirement and general operation requirements. Idle mode is able to save power and operational resources used by a terminal in a manner of put limitation on a terminal action to be scanned in a discrete cycle.

Idle mode provides a simple and proper method of informing a terminal for a downlink traffic in pending and is able to give the benefit to a network and a base station by removing a wireless interface and a network handover (HO) traffic from an inactive terminal.

DISCLOSURE OF INVENTION

Technical Problem

Generally, a paging group that covers one wide area for idle-mode terminals is used. If there is a call or packet to transmit to a mobile station, a paging controller should deliver a paging message to all base stations within a paging group to find a corresponding mobile station for the corresponding call or packet.

Moreover, every mobile station within a paging group should keep monitoring a radio channel for a paging listening interval to check whether there exists a paging message transmitted to the corresponding mobile station. Therefore, the mobile station may waste power unnecessarily.

Accordingly, the present invention is directed to a paging method that substantially obviates one or more of the problems due to limitations and disadvantages of the related art.

An object of the present invention is to provide an efficient paging method.

Another object of the present invention is to provide a paging method, by which a superframe header for supporting efficient paging can be provided.

Another object of the present invention is to provide an efficient paging method, by which a new paging group identifier (e.g., a large paging group identifier and a small paging group identifier).

A further object of the present invention is to provide an efficient paging method using the new paging group identifier.

The technical problem which is to be obviated by the present invention is not limited to the problems mentioned above. Moreover, other problems which are not mentioned above can be apparent to those skilled in the art from the description which follows.

Technical Solution

In order to solve the above technical problems, the present invention discloses a method for efficiently paging in a wireless access system.

In one aspect of the present invention, a method for efficiently paging a mobile station of an idle mode comprises allocating an identifier of a large paging group and an identifier of a specific one of small paging groups included in the large paging group to a broadcast channel region and transmitting a header including the broadcast channel region to the terminal.

Preferably, the broadcast channel region includes a primary broadcast channel (PBCH) having network common informations allocated thereto and a secondary broadcast channel (SBCH) having cell specific informations allocated thereto.

Also, the large paging group paging information is allocated to the primary broadcast channel and the small paging group paging information is allocated to the secondary broadcast channel.

Also, if a plurality of large paging groups exist on a prescribed network, at least one of the large paging group identifier and the small paging group identifier is allocated to the secondary broadcast channel.

Also, at least one of a large paging indicator and a small paging indicator is further allocated to the secondary broadcast channel.

Also, the broadcast channel region includes a first region using a single frequency network (SFN) and a second region including cell specific information.

Also, the first region includes the large paging group identifier and the second region includes the small paging group identifier.

Also, the second region further includes a paging group change flag indicating a paging group change of the terminal.

Also, the paging method further includes the step of receiving a ranging request message including an identifier of the specific small paging group from the terminal. In this case, the ranging request message is transmitted for a location update.

Also, the paging method further includes the step of receiving a ranging request message including an identifier of the specific small paging group different from the former identifier of the specific small paging group from the terminal. In this case, the ranging request message is transmitted for a location update.

Also, the header is a superframe header.

In another aspect of the present invention, a method of efficiently paging for a mobile station of an idle mode comprises receiving a header including a broadcast channel region including an identifier of a large paging group and an identifier of a specific one of small paging groups included in the large paging group and transmitting a message including the identifier of the specific small paging group.

Preferably, the broadcast channel region includes a primary broadcast channel (PBCH) to which information used in common for the large paging group is allocated and a secondary broadcast channel (SBCH) to which information used for a prescribed cell in the large paging group is allocated.

Also, the large paging group paging information is allocated to the primary broadcast channel and the small paging group paging information is allocated to the secondary broadcast channel.

Also, if a plurality of large paging groups exist on a prescribed network, at least one of the large paging group identifier and the small paging group identifier is allocated to the secondary broadcast channel.

Also, at least one of a large paging indicator and a small paging indicator is further allocated to the secondary broadcast channel.

Also, the broadcast channel region includes a first region using a single frequency network (SFN) and a second region including cell specific information.

Also, the first region includes the large paging group identifier and the second region includes the small paging group identifier.

Also, the second region further includes a paging group change flag indicating a paging group change of the terminal.

Also, the header is a superframe header.

Also, the message is a ranging message and the ranging message is transmitted for the terminal to perform a location update.

In still another aspect of the present invention, a method for efficiently paging a mobile station of an idle mode comprises allocating prescribed cycle information for transmitting an identifier of a paging group to which the terminal belongs and a paging indicator indicating whether there is a message to be transmitted to the terminal to a broadcast channel, transmitting a superframe header including the broadcast channel, and transmitting the paging group identifier and the paging indicator to the terminal in a prescribed subframe indicated by the prescribed cycle information. In this case, the broadcast channel includes a primary broadcast channel (PBCH) and a secondary broadcast channel (SBCH).

Preferably, the paging group identifier includes at least one of a large paging group identifier and a small paging group identifier and the paging indicator includes at least one of a large paging group indicator and a small paging group indicator.

Also, the prescribed cycle information is allocated to either the primary broadcast channel or the secondary broadcast channel.

Also, the step of transmitting the paging group identifier and the paging indicator to the terminal is performed only if it is necessary for the base station to transmit a paging message to the terminal.

Also, the paging group identifier includes a group type identifier field indicating whether a paging group allocated to the terminal is the large paging group or the small paging group and a group identifier field uniquely indicating the paging group to which the terminal is allocated.

In a further aspect of the present invention, a method of efficiently paging for a mobile station of an idle mode comprises receiving a broadcast channel to which prescribed cycle information for transmitting a paging group identifier, to which the terminal belongs, and a paging indicator indicating whether there is a paging message to be transmitted by the terminal is allocated and receiving the paging group identifier and the paging indicator in a prescribed subframe indicated by the prescribed cycle information. In this case, the broadcast channel includes a primary broadcast channel and a secondary broadcast channel.

In a still further aspect of the present invention, a method of efficiently paging for a mobile station of an idle mode comprises receiving paging information including at least one of a large paging group identifier for a paging group to which a mobile station belongs, a large paging group offset, a small paging group identifier and a small paging group offset.

Preferably, the paging method further includes the steps of enabling the mobile station to decode a prescribed radio resource in a small paging group using the small paging group identifier and the small paging group offset, moving the mobile station into a large paging group from the small paging group, and enabling the mobile station to receive a paging message using the large paging group identifier and the large paging group offset in the large paging group.

Also, the paging method further includes the steps of enabling the mobile station to decode a prescribed radio resource in a large paging group using the large paging group identifier and the large paging group offset, moving the mobile station into a large paging group from the small paging group, and enabling the mobile station to receive a paging message using the small paging group identifier and the small paging group offset in the small paging group.

Also, the paging information can be obtained through at least one of a superframe header (SFH) and a deregistration command (DREG-CMD) message.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, paging can be efficiently performed through embodiments of the present invention.

Secondly, efficient paging can be performed in a manner that a large paging group identifier (LPG ID) and a small paging group identifier (SPG ID) are contained in an broadcast channel (BCH) of a superframe header. In particular, a mobile station is able to check a paging group identifier (LPG ID & SPG ID) of the mobile station by decoding a superframe header at a start time of a paging cycle. Therefore, a location update of a mobile station by SPG unit can be supported.

Thirdly, a paging controller is able to send a paging message to a specific SPG instead of LPG using location update information of a mobile station. Therefore, it is able to considerably save power consumption of other mobile stations within the LPG.

Additional features and advantages which are not mentioned above of the invention will be set forth in the description which follows, and will be apparent to those skilled in the art from the description, or may be learned by practice of the invention.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
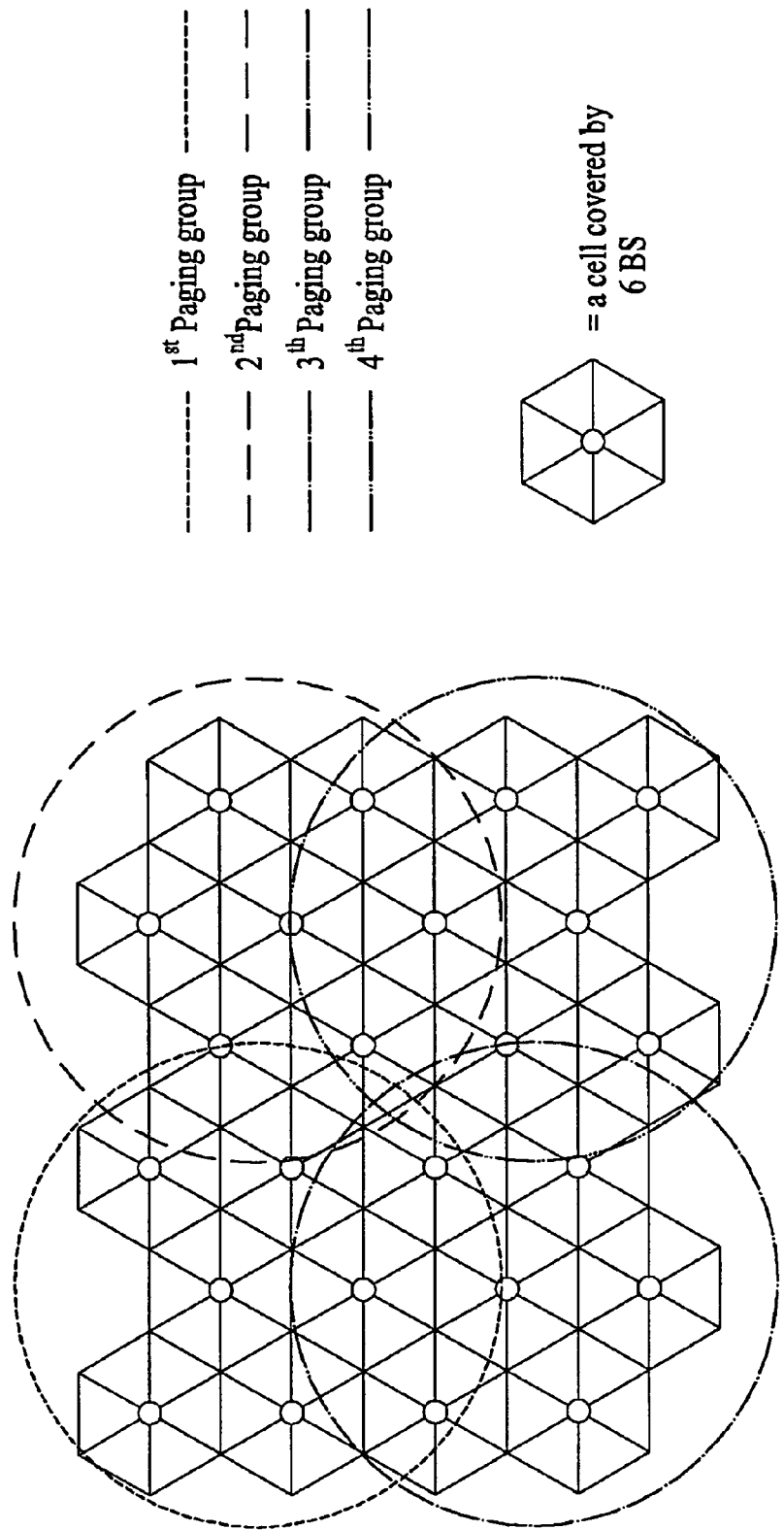
FIG. 1 is a diagram for an example of a paging group consisting of a plurality of base stations.

Reference will now be made in detail to the preferred embodiments of the present invention, examples of which are illustrated in the accompanying drawings.

The present invention relates to a wireless access system, and more particularly, to a paging method used for the wireless access system.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of the drawings, procedures, steps and/or the like are not described to avoid making the gist of the present invention unclear.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Moreover, a transmitting side means a node configured to transmit a data or audio service and a receiving side means a node configured to receive the data or audio service. Therefore, in uplink, a terminal becomes a transmitting side and a base station can become a receiving side. On the contrary, in downlink, a terminal becomes a receiving side and a base station can become a transmitting side.

Besides, a mobile station of the present invention can include a PDA (personal digital assistant), a cellular phone, a PCS (personal communication service) phone, a GSM (global system for mobile) phone, a WCDMA (wideband CDMA) phone, an MBS (mobile broadband system) phone or the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

In the following description, specific terminologies are provided to help the understanding of the present invention. And, the use of the specific terminology can be modified into another form within the scope of the technical idea of the present invention.

Figure 2:
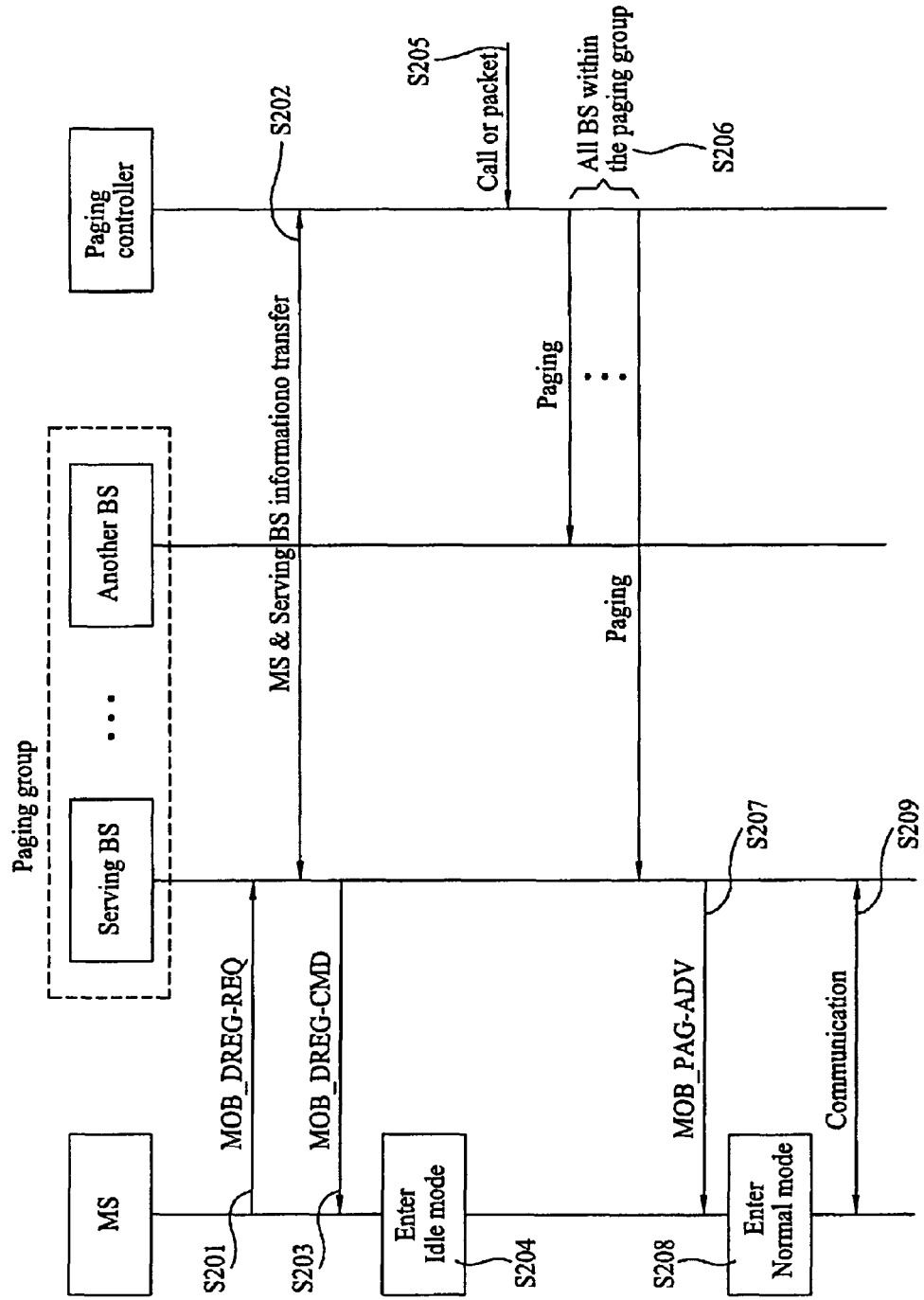
FIG. 2 is a diagram for a paging procedure in IEEE 802.16 system as a wireless access system.

FIG. 2 is a diagram for a paging procedure in IEEE 802.16 system as a wireless access system.

In idle mode, paging can be performed by a paging group unit. For instance, a mobile station can belong to one or more paging groups. In case that a call or a user packet toward a mobile station is incoming from an external network, a paging controller (hereinafter abbreviated PC) of each of the paging groups performs paging for searching for the corresponding mobile station. In doing so, the paging controller delivers a paging message to all base stations within the corresponding paging group. Each of the base stations having received the paging message then broadcasts a paging advertisement (MOB-PAG_ADV) message to the corresponding mobile station. Thus, the paging can be performed in this manner.

Referring to FIG. 2, a mobile station sends a deregistration request (MOB-DREG-REQ) message to a serving base station to enter an idle mode from a normal mode [S201].

Having received the deregistration request message, the serving base station is able to exchange terminal information and serving base station information with a paging controller. In particular, the serving base station is able to inform the paging controller of a terminal identifier of the terminal entering the idle mode and a serving base station identifier. And, the paging controller is able to inform the serving base station of a paging group identifier (PG ID) or a paging controller identifier (PC ID). In this case, the paging group identifier (PG ID) or the paging controller identifier (PC ID) is usable in transmitting/receiving a paging message [S202].

The serving base station is able to send a deregistration command MOB_DREG-CMD) message to the mobile station in response to the deregistration request message. In this case, the deregistration command message can contain paging information (e.g., a paging cycle), a paging offset and a paging listening interval). And, the deregistration command message can further contain a paging controller identifier and a paging group identifier [S203].

Having checked the MOB_DREG-CMD message, the mobile station enters the idle mode. The mobile station is able to receive a paging message based the paging information received via the MOB_DREG-CMD message. In particular, the mobile station is able to monitor a radio channel to check whether there is a paging message delivered to the mobile station for the paging listening interval. And, the mobile station operates in sleep mode or 'radio turn off' for the rest of time. Hence, the mobile station is able to reduce battery consumption [S204].

A call or packet may be inputted to the paging controller [S205].

In case of receiving a call or an external packet, the paging controller is able to perform a paging procedure. In this case, the paging controller delivers a paging message to all base stations within a paging group [S206].

Having received the paging message, all the base stations within the paging group broadcast MOB-PAG-ADV messages to all mobile stations managed by the base stations, respectively [S207].

The corresponding mobile station checks the MOB_PAG-ADV message. If the mobile station is paged by the paging controller, the mobile station enters a normal mode and is then able to perform communications with the serving base station [S208, S209].

1. Small Paging Group & Large Paging Group

Figure 3:
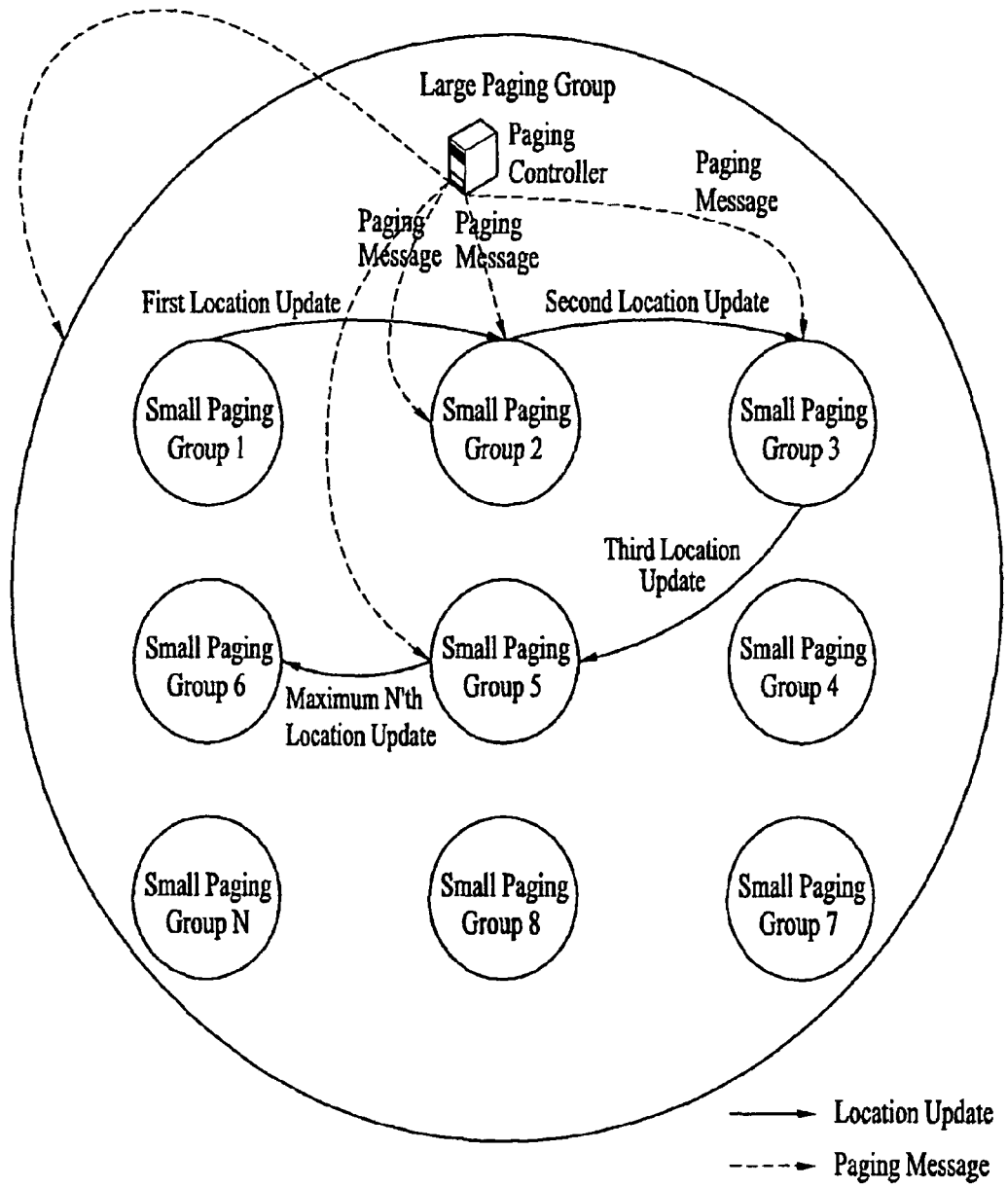
FIG. 3 is a diagram for a regional concept of a large paging group and small paging groups according to one embodiment of the present invention.

FIG. 3 is a diagram for a regional concept of a large paging group and small paging groups according to one embodiment of the present invention.

According to one embodiment of the present invention, a small paging group (hereinafter abbreviated SPG) is newly defined. The small paging group may mean a paging group smaller than a generally used paging group in size.

And, a large paging group (hereinafter abbreviated LPG) having an area greater than that of a conventional paging group is newly defined and at least one SPG can be included in this large paging group. In this case, of course, a size of the SPG may equal to or smaller than that of a general paging group. And, the size of the SPG may vary according to user requirements or a channel status.

According to one embodiment of the present invention, if a mobile station exists within a specific SPG, it is able to reduce power consumptions of mobile stations of another SPG in a manner that a paging controller sends a paging message to a base station within the specific SPG only. If a mobile station does not exist in a prescribed SPG, it is able to send a paging message to all base stations included in a large paging group (LPG).

According to one embodiment of the present invention, two paging group identifiers (e.g., LPG ID and SPG ID) are defined. Hence, a specific SPG ID and a specific LPG ID are provided to every mobile station and are usable for a paging controller to deliver a paging message.

According to one embodiment of the present invention, when a mobile station moves in a cell area of a base station, a location update is not performed but is performed only if an SPG is changed. If a location update is performed each time a mobile station moves away into another SPG, it may happen that a location update signaling overhead is generated.

Therefore, according to one embodiment of the present invention, a mobile station sets a prescribed small paging group change counter (SPG change counter) and is then able to perform location update(s) amounting to a maximum number (N). Namely, if the mobile station moves to another SPG as much as the maximum number of times N, a paging controller is able to send a paging message to all base stations not within a specific SPG but within an LPG.

2. Superframe Header Structure

Figure 4:
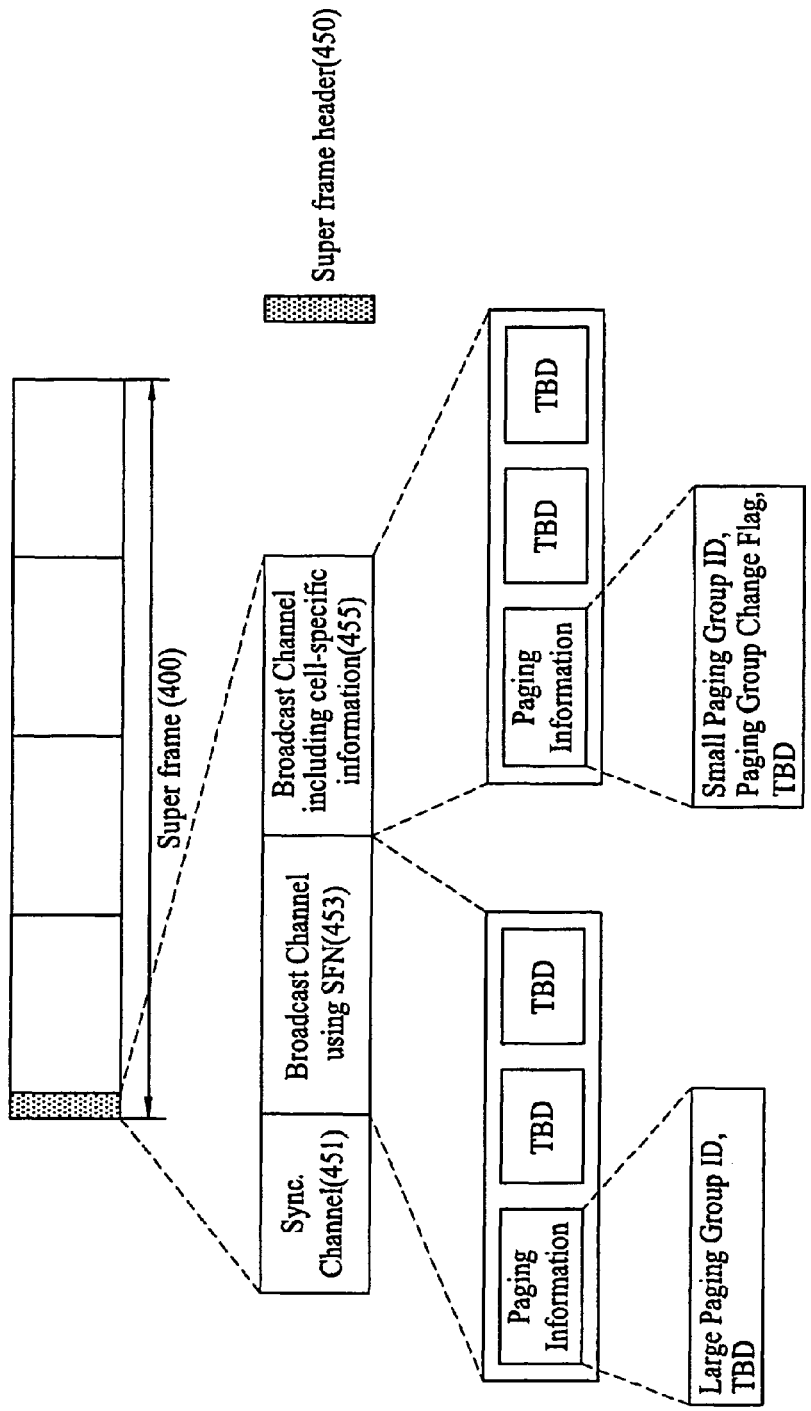
FIG. 4 is a diagram for an example of a superframe header containing paging information according to another embodiment of the present invention.

FIG. 4 is a diagram for an example of a superframe header containing paging information according to another embodiment of the present invention.

A superframe 400 used for embodiments of the present invention is constructed with four frames and can have a size of 20 ms. And, one of the four frames can be constructed with eight subframes. A superframe header 450 containing scheduling information on the superframe can be allocated to a first subframe of the superframe. And, the superframe header 450 can include a broadcast channel (BCH) region.

According to another embodiment of the present invention, a serving base station is able to allocate a large paging group identifier (LPG ID) and a small paging group identifier (SPG ID) to a superframe header (SFH). And, a broadcast channel (BCH) region can be divided into at least one region according to a function. Preferably, according to one embodiment of the present invention, assume a case that a broadcast channel region is divided into two regions.

For instance, the superframe header 450 can include a synchronization (sync.) Channel 451, a single frequency network broadcast channel (SFN BCH) 453 and a cell specific broadcast channel (CS BCH) 455. The SFN broadcast channel 453 is a broadcast channel which uses a carrier network based on a single frequency, whereas the cell specific broadcast channel 455 is a broadcast channel containing information valid for a specific cell only. Yet, a broadcast channel is available in a manner of being divided into at least three regions according to user requirements or a channel status.

According to embodiments of the present invention, an SFN broadcast channel is usable as a same or similar concept of a primary broadcast channel (PBCH). And, a cell specific broadcast channel is usable as a same or similar concept of a secondary broadcast channel (SBCH).

Referring to FIG. 4, each of the SFN broadcast channel 453 and the cell specific broadcast channel 455 includes a paging information field. It can be observed that a base station has allocated an LPG ID to the paging information field of the SFN broadcast channel. And, it can be also observed that the base station has allocated an SPG ID to the paging information field of the cell specific broadcast channel.

In the following description, explained is the reason why the large paging group identifier (LPG ID) is included in the paging information field of the SFN broadcast channel 453.

First of all, a single frequency network (SFN) is able to transmit the same data on the same frequency in a wide range by the same modulation scheme. Therefore, it is preferable that information contained in a broadcast channel region is the information that can be used in common by all mobile stations within a large paging group.

And, it is able to improve a bit error rate (BER) in a manner that every base station belonging to a large paging group broadcasts information contained in an SFN broadcast channel region on the same frequency using the SFN scheme.

Moreover, in case that every base station within a large paging group broadcasts information of an SFN broadcast channel on the same frequency using the SFN scheme, it is able to use an LPG ID as a single frequency network identifier (SFN ID).

In the following description, explained is the reason why the SPG ID is allocated to the paging information field of the cell specific broadcast channel 455.

First of all, since information contained in the cell specific broadcast channel is valid for a specific cell only, it is preferable that the information can be used by a mobile station included in the specific cell only. It is able to define SPG as a small area for controlling a small number of base stations. Therefore, mobile stations existing within the SPG just need to receive specific information from base stations within the SPG instead of all base stations within LPG.

In case that a mobile station moves away into a different SPG, it needs an SPG ID specific to the SPG for a location update. Hence, a management identifier by SPG unit is necessary. In this case, all base stations within the same SPG can have the same SPG ID.

Yet, according to user requirements, a channel status or other communication environments, an LPG ID can be contained in paging information of cell specific BCH. And, an SPG ID can be contained in paging information of the SFN broadcast channel region.

The base station may further include a paging group change flag in the cell specific broadcast channel 455. And, the paging group change flag can be used for a case of attempting to change a paging group to which a mobile station belongs. In particular, a base station is able to instruct a terminal to change a paging group from LPG to SPG or from SPG to LPG using the paging group change flag. Details of the paging group change flag shall be explained later.

3. Paging Message Receiving Method

According to a further embodiment of the present invention, a mobile station is able to receive a paging message using paging information received on an SFN broadcast channel and a cell specific broadcast channel.

A mobile terminal enters an idle mode, checks a superframe header transmitted from a serving base station, and is then able to check its paging group identifier.

A paging controller preferentially transmits a paging message to an SPG where a mobile station is located. Yet, if the mobile station moves into SPGs maximum N times, the paging controller is able to transmit the paging message to an LPG instead of a specific SPG.

If the paging controller should deliver a paging message to an SPG at all times, the mobile station has to perform a location update to inform the paging controller of a location of the mobile station each time moving away from one SPG into another SPG.

If a mobile station performs a location update each time moving away from one SPG to another SPG, a considerable signaling overhead can be generated. Therefore, the mobile terminal may be enabled to perform location updates maximum N times only. If the mobile station performs location updates over N times, the paging controller may transmit a paging message to all base stations within an LPG.

In order to perform a further embodiment of the present invention, a mobile station is able to set up an SPG change counter. In this case, if a mobile station performs SPG changes over N times, it is able to make a request for a change of a paging group to a base station and/or a paging controller. Moreover, the paging controller is able to set up and operate an SPG change counter as well. In this case, the paging controller is able to instruct the mobile station to perform a change of a paging group.

A mobile station is able to check whether there is a paging message delivered to itself by a different cycle according to a paging group, to which the mobile station belongs, via a superframe header. Thus, the mobile station is able to reduce its power consumption.

For instance, in case of entering an idle mode, a mobile station is able to have a paging cycle and a paging offset allocated thereto by a serving base station. Through the paging cycle and the paging offset, the mobile station is able to know a timing point to decode a superframe header within the paging cycle. In particular, the mobile station is able to check a superframe header (e.g., a paging information field of BCH) at a specific timing point according to a paging offset value. Therefore, if a paging message delivered to a mobile station does not exist, the mobile station is able to reduce its power consumption by powering down during a remaining paging cycle.

Figure 5:
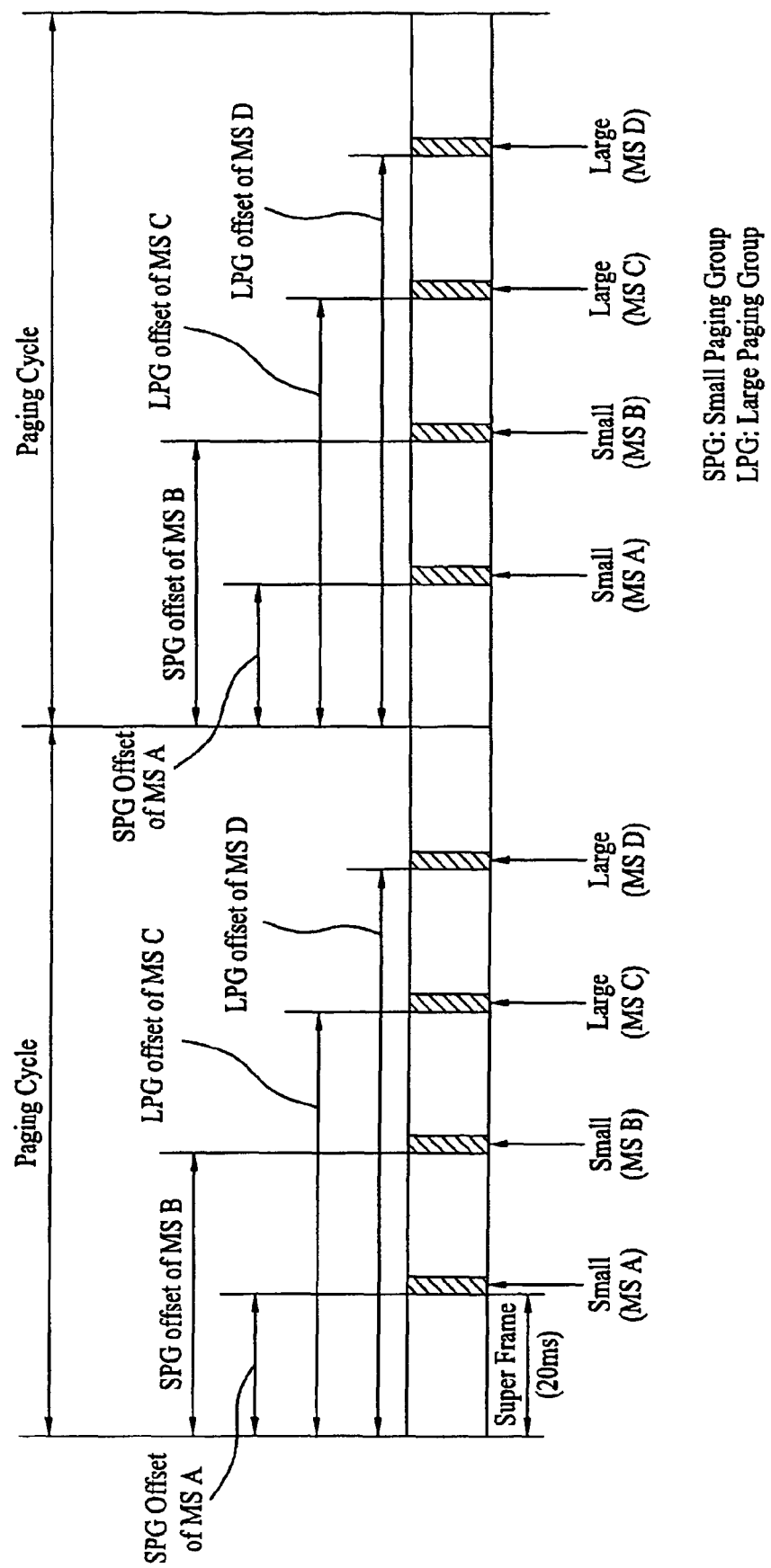
FIG. 5 is a diagram for a case that a terminal receives a paging message using a paging offset value within a paging cycle.

FIG. 5 is a diagram for a case that a terminal receives a paging message using a paging offset value within a paging cycle.

Referring to FIG. 5, at least one or more mobile stations may belong to a same paging group or different paging groups. For instance, a mobile station A and a mobile station B can be included in different SPGs, respectively. And, a mobile station C and a mobile station D can be included in different LPGs, respectively. Moreover, FIG. 5 assumes that SPG and LPG offset values are set different. In FIG. 5, assume that each mobile station is in idle mode. And, assume that paging information for receiving a paging message is obtained through a DREG-CMD message or a superframe header (SFH).

Therefore, each mobile station is able to minimize its power consumption by monitoring a paging message at an offset value allocated to the corresponding mobile station. In particular, each mobile station is able to minimize its power consumption by reducing a cycle for decoding a superframe header to check a presence or non-presence of a paging message.

In FIG. 5, each mobile station decodes a super fame header corresponding to its paging group only. For instance, a mobile station A is able to adjust a cycle for decoding a superframe header using a paging cycle and an SPG offset of the mobile station A. Of course, a mobile station B or a mobile station D is able to decode a superframe header with a corresponding offset value using an SPG or LPG offset value allocated to itself.

In FIG. 5, each of the mobile stations is able to adjust a cycle for receiving a paging message according to a paging cycle index contained in paging information.

For instance, if a paging cycle index value is set to '0', a mobile station is able to respond to a paging message one time only for one paging cycle. If a paging cycle index value is set to '1', it is able to set a mobile station to respond to a paging message one time for two paging cycles. If a paging cycle index value is set to '2', it is able to set a mobile station to respond to a paging message one time only for three paging cycles.

Hence, the larger a paging cycle index value gets, the less a power consumption of a mobile station becomes. Yet, a probability of decoding a paging message successfully becomes smaller than that of the case of a small paging cycle index value.

In FIG. 5, a value of a paging cycle index can be set in various ways. For instance, it is able to allocate a fixed paging cycle using prescribed bits. Moreover, it is able to indicate a position of a specific offset using a bitmap value (e.g., 0b0000000/000).

In the following, a case where a mobile station moves away from a small (or a large) paging group into a large (or a small) paging group according to the above described embodiment is explained.

In brief, in order to receive a paging message, an idle-mode mobile station preferentially receives paging information containing at least one of a large paging group identifier for a paging group to which the mobile station belongs, a large paging group offset, a small paging group identifier and a small paging group offset. Subsequently, the mobile station is able to decode a radio resource carrying a paging message in a small paging group using the received paging information. If the mobile station moves away from a small paging group into a large paging group, it is able to receive a paging message using a large paging group identifier and a large paging group offset in the large paging group.

On the contrary, it is able to preferentially decode a radio resource carrying a paging message in a large paging group suing the received paging information. Moreover, if the mobile station moves away from a large paging group into a small paging group, it is able to receive a paging message using a small paging group identifier and a small paging group offset in the small paging group.

Meanwhile, in case that a mobile station belongs to at least one or more multiple paging groups (e.g., at least one LPG and at least one SPG), a base station is able to set a multiple paging group according to each paging group. In this case, at least one small paging group offset (SPG Offset) value and/or at least one large paging group offset (LPG Offset) value can be contained in the multiple paging offset.

Therefore, a base station allocates at least one of a large paging group identifier, a large paging group offset, a small paging group identifier and a small paging group offset to each mobile station and is then able to information the corresponding mobile station of the allocation. And, every mobile station is able to transmit/receive a paging message using a specific SPG ID, a small paging group offset (SPG Offset), an LPG ID and a large paging group offset (LPG Offset).

4. Method of Changing Paging Group of Mobile Station Located on LPG Edge

In case that SFN paging is supported, a mobile station is on the edge of an LPG area may be unable to receive a paging message from a paging controller. For instance, when a mobile station enters an idle mode, it is able to receive a paging message by setting its paging group to SPG. In case that a mobile station moves between SPGs by maximum N times, it changes a paging group from SPG to LPG and then receives a paging message using LPG ID.

Yet, in case that a paging group of a mobile station is LPG, the mobile station receives paging information (e.g., information indicating whether there is a paging message delivered to a mobile station) using SFN. In this case, if a mobile station is located on the edge of an LPG area, there may be a problem that the mobile station fails to receive a paging message as a result of missing paging information.

To solve this problem, explained in the following description is a method of changing a paging group for a mobile station on the edge of LPG according to another embodiment of the present invention.

Referring to FIG. 4, a target base station allocates a paging group change flag to a cell specific broadcast channel and is then able to transmit it to a mobile station. If a mobile station belonging to LPG moves away into an edge of an LPG area, a paging controller is able to information a target base station, to which the mobile station belongs, of location information of the mobile station. Hence, in order to instruct a paging group change of the mobile station, the target base station is able to transmit a paging group change flag to the mobile station on a cell specific broadcast channel.

In particular, a mobile station is able to change a paging group from LPG to SPG by receiving a paging group change flag transmitted on a cell specific broadcast channel. In this case, irrespective of a fact that a mobile station has moved between SPGs by maximum N times, the mobile station is able to change its paging group to SPG from LPG. Therefore, the mobile station is able to receive the paging message using an SPG ID.

In case that a cell or a base station on the LPG edge sets a paging group change flag to 1 and then broadcasts it to a mobile station, the mobile station having moved into the LPG edge checks BCH (group change flag of paging information field) broadcasted by a target base station and is then able to recognize that a group has to be changed. Moreover, if a mobile station or a target base station recognizes the change of a paging group and then the mobile station performs a location update with the target base station, a paging controller is able to know the paging group change as well.

Figure 6:
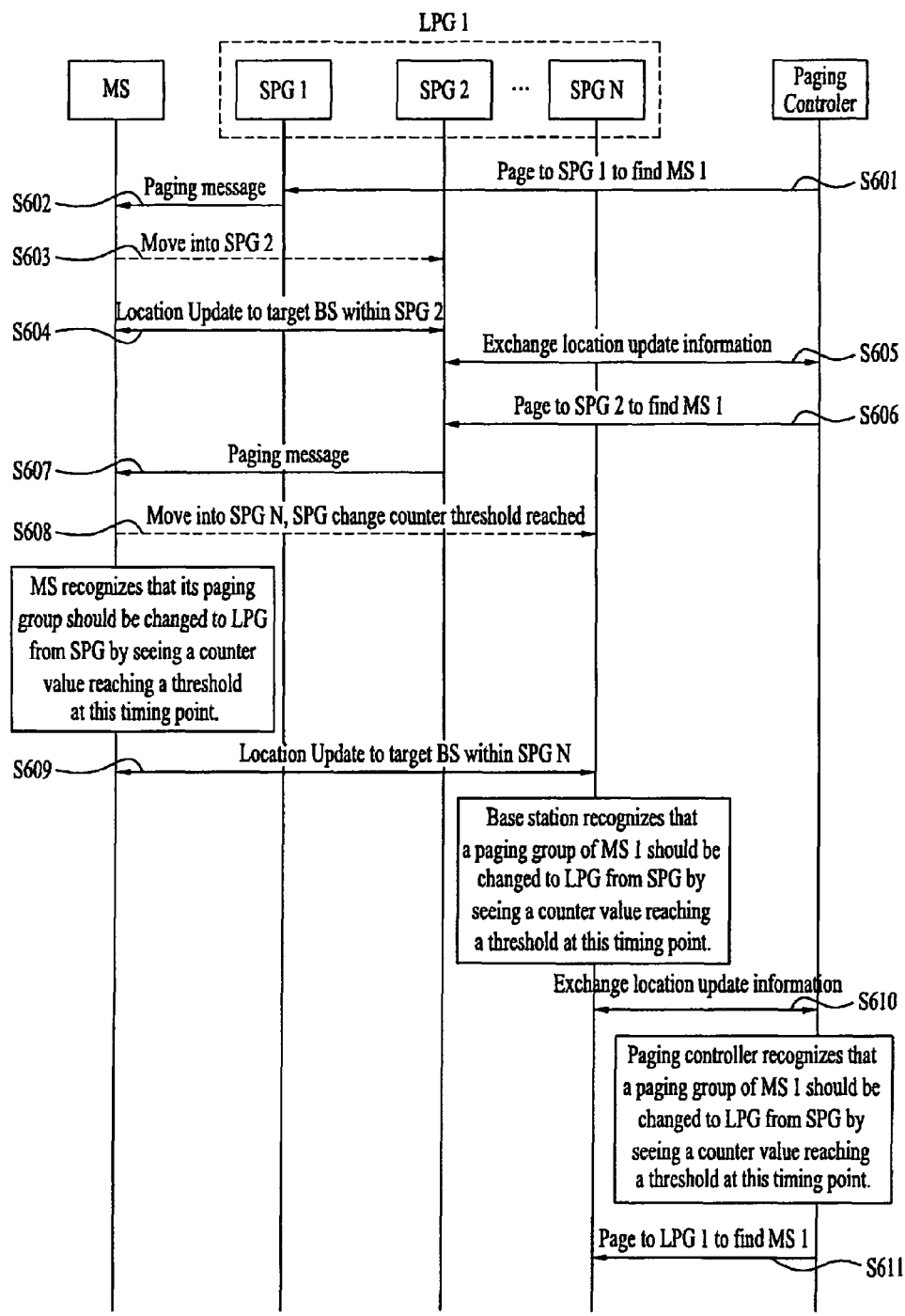
FIG. 6 is a diagram for a method of changing a paging group according to still another embodiment of the present invention.

FIG. 6 is a diagram for a method of changing a paging group according to still another embodiment of the present invention.

Referring to FIG. 6, one large paging group (LPG) is able to include at least one small paging group (SPG). And, at least one base station can be included in the SPG. In this case, the number of SPGs included in the LPG and the number of base stations included in the SPG may vary according to a system requirement or a channel status. Although data or messages are transceived between a base station and a mobile station within each SPG or LPG, the following description is provided on the assumption that messages are transceived between a mobile station and SPG or LPG, for clarity of the description.

First of all, in order to page a mobile station in idle mode, a paging controller is able to send a paging message to SPG 1 to which the mobile station currently belongs [S601].

Subsequently, the SPG 1 delivers the paging message to the mobile station [S602].

If the mobile station moves away into SPG 2 from the SPG 1 [S603], the mobile station is able to perform a location update with a target base station belonging to the SPG 2 [S604].

The SPG 2 is able to transmit mobile station information according to the location update of the mobile station, SPG 2 information and target base station information of the SPG 2 to the paging controller [S605].

The paging controller is able to recognize that the current mobile station exists within an area of the SPG 2 through the location update of the mobile station. Hence, if there is a call or packet to be transmitted to the mobile station, the paging controller sends a paging message to the SPG 2 [S606]. The SPG 2 is then able to forward the paging message to the mobile station [S607].

As the mobile station moves at high speed, it may move through at least one or more SPG areas. In this case, assume a case that the mobile station has moved SPG areas amounting to a threshold N of an SPG change counter of the mobile station [S608].

In this case, as the SPG change counter of the mobile station reaches the threshold, the mobile station is able to recognize that its paging group should be changed into LPG from SPG.

As the mobile station moves into an SPG N in the step 5608, the mobile station is able to perform a location update with a target base station belonging to the SPG N [S609].

The target base station of the SPG N checks a counter value reaching the threshold and is able to recognize that the paging group of the mobile station should be changed.

The target base station of the SPG N is able to forward location update information of the mobile station to the paging controller. In particular, the SPG N is able to transmit mobile station information according to a location update of the mobile station, SPG N information and target base station information of the SPG N to the paging controller [S610].

Subsequently, if the paging controller receives the location update information from the SPG N, it is able to recognize that the SPG change counter value reaches the threshold. Namely, the paging controller can recognize that the paging group of the mobile station should be changed into LPG from the SPG N. Therefore, the paging controller is able to send a paging message to the LPG 1 [S611].

According to embodiments of the present invention, a mobile station, a base station and/or a paging controller can include an SPG change counter. Therefore, if an SPG change counter value meets the condition for changing a paging group, if the mobile station, the base station and/or the paging controller is able to instruct a paging group of the mobile station to be changed.

In FIG. 6, shown is a case that a mobile station, a base station and a paging controller include SPG change counters, respectively. Therefore, all of the mobile station, the base station and the paging controller are aware of a time for changing SPG into LPG. Each of the base station and the paging controller is able to update the SPG change counter through location update. In particular, if a value of the SPG change counter meets the condition for changing a paging group, the paging controller is able to instruct the paging group to be changed.

Figure 7:
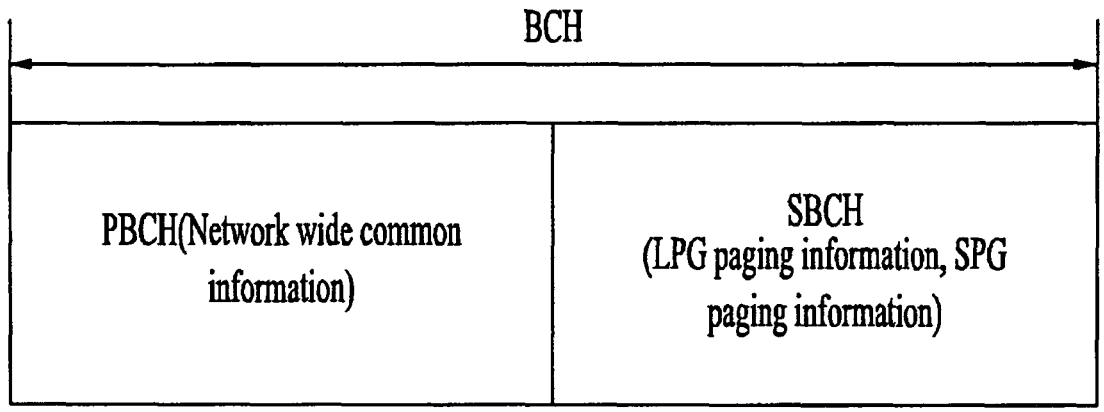
FIG. 7 is a diagram for an example of a broadcast channel (BCH) structure according to still another embodiment of the present invention.

FIG. 7 is a diagram for an example of a broadcast channel (BCH) structure according to still another embodiment of the present invention.

In FIG. 7, a method of transmitting a paging group identifier (e.g., LPG ID and SPG ID) and a paging indicator using a broadcast channel (BCH) is shown. In this case, the paging indictor means a field for indicating a presence or non-presence of a paging message delivered to a mobile station.

According to embodiments of the present invention, one BCH can be divided into one or more channel regions. According to this embodiment of the present invention, one BCH is preferably divided into two channel regions. Namely, one BCH is divided into two channel regions including a primary broadcast channel (PBCH) and a secondary broadcast channel (SBCH). In this case, the primary broadcast channel is able to use the SFN scheme.

Referring to FIG. 7, information used in common to network (e.g., network common information) can be allocated to a primary broadcast channel and LPG paging information and SPG paging information can be allocated to the secondary broadcast channel. In this case, an LPG ID and an LPG indicator can be included in the LPG paging information, while an SPG ID and an SPG indicator can be included in the SPG paging information.

Explained in the following description is the reason why LPG paging information and SPG paging information are allocated to the secondary broadcast channel.

First of all, a primary broadcast channel is a channel for carrying informations used in common for a whole system. However, in case that a plurality of large paging groups (LPGs) exist in the whole system, an LPG indicator is changeable per LPG. In this case, since the LPG indicator is not the information used in common for the system, it is unable to transmit the LPG indicator on the primary broadcast channel that uses the SFN scheme.

Yet, if a size of an LPG area is designed to have the same size of a whole network, an LPG paging indicator becomes information used in common for a network (network wide common information), it can be carried on PBCH using SFN.

Referring now to FIG. 7, network common information is delivered on PBCH and LPG information (LPG ID and/or LPG indicator) and SPG paging information (SPG ID and/or SPG indicator) are included via SBCH containing cell specific information. Thus, it is able to support a location update of a mobile station and hierarchical paging.

Figure 8:
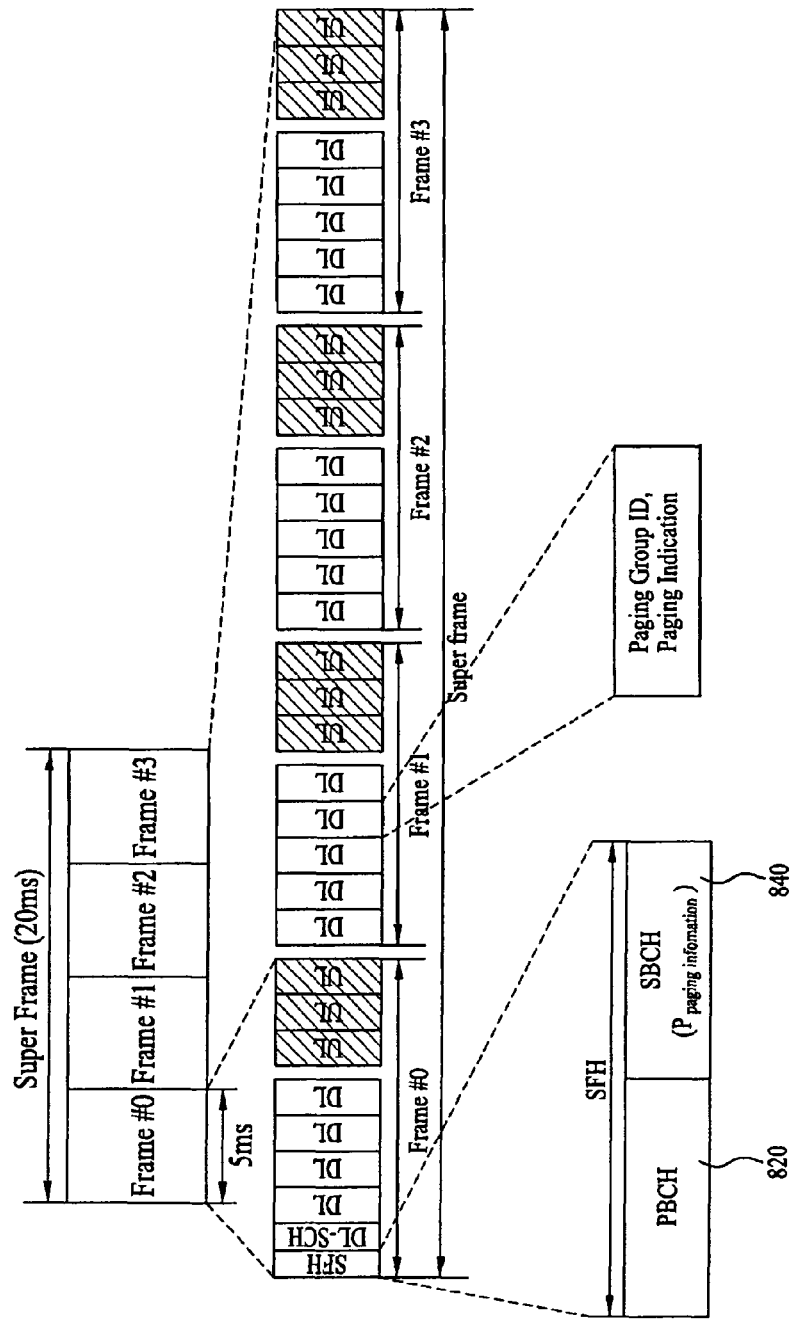
FIG. 8 is a diagram for a method of transmitting paging information from a fixed location according to still another embodiment of the present invention.

FIG. 8 is a diagram for a method of transmitting paging information using a fixed location of a superframe according to still another embodiment of the present invention.

Referring to FIG. 8, one superframe (e.g., 20 ms) includes four frames (e.g., 5 ms each). One frame can include five downlink subframes and three uplink subframes. In this case, a superframe header (SFH) and a downlink shared channel (DL-SCH) can be allocated to a first subframe of a first frame (Frame #0).

A broadcast channel can be transmitted via a superframe header. And, a structure of the broadcast channel can include a primary broadcast channel (PBCH) 820 and a secondary broadcast channel (SBCH) 840, which is similar to the former description of FIG. 4. According to a Still another embodiment of the present invention, a base station is able to periodically transmit paging information from a prescribed fixed position (e.g., a specific subframe) to a mobile station. The paging information transmitted by the base station to the mobile station can include a paging group identifier and a paging indicator.

In order to periodically transmit the paging information in a fixed subframe to the mobile station, the base station needs to inform the mobile station of information PPaging Information on a cycle for transmitting the paging information. Hence, the base station is able to deliver the cycle information for transmitting the paging information to the mobile station on a broadcast channel. In particular, the base station is able to transmit the paging cycle information PPaging Information on either a primary broadcast channel or a secondary broadcast channel of the broadcast channel to the mobile station.

According to the embodiment of the present invention, assume that paging information (e.g., a paging group identifier and a paging indicator) is transmitted in a fourth downlink subframe of each frame. Yet, the paging information is transmitted if necessary only. In particular, paging information is not periodically transmitted to a mobile station at a fixed position. Hence, even if a mobile station periodically awakes at a fixed position and then decodes a corresponding downlink subframe, it is not always able to obtain the paging information.

In this case, a base station is able to efficiently use downlink radio resources in a manner of delivering other downlink information in a fixed downlink (DL) subframe for delivering paging information (e.g., paging group ID, paging indicator). Moreover, a position of the fixed downlink subframe for delivering the paging group ID and the paging indicator can correspond to any one of downlink subframes of a superframe.

Figure 9:
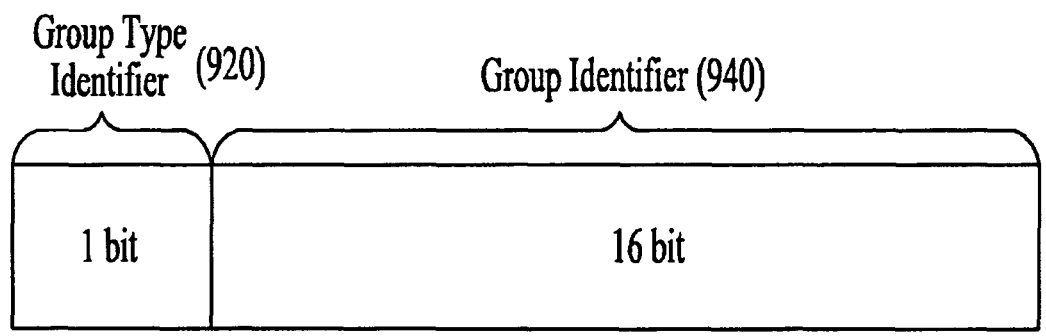
FIG. 9 is a diagram for an example of a format of a paging group identifier available for embodiments of the present invention.

FIG. 9 is a diagram for an example of a format of a paging group identifier available for the embodiments of the present invention.

Referring to FIG. 9, a paring group identifier can include a 1-bit group type identifier 920 and a 16-bit group identifier 940. The group type identifier 920 has a size of 1 bit and is able to indicate whether it is a paging group for a mobile station having low mobility or a paging group for a mobile station having high mobility. For instance, if the group type identifier 920 is set to '0', it indicates a paging group for a mobile station having a low moving speed. If the group type identifier 920 is set to '1', it is able to indicate a paging group for a mobile station having a high moving speed.

Of course, a group type identifier can have a size equal to or greater than 2 bits and a group identifier can have a size equal to or smaller than 16 bits. Moreover, a size of a paging group identifier can be changed according to user requirements or a channel status.

According to a further embodiment of the present invention, a terminal and a base station (FBS, MBS) are explained as a transmitting side or a receiving side for performing the above-described embodiments of the present invention.

First of all, a terminal works as a transmitter in uplink and is able to work as a receiver in downlink. A base station works as a receiver in uplink and is able to work as a transmitter in downlink. In particular, each of the terminal and the base station includes a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like.

A terminal used for embodiments of the present invention can include a low-power RF/IF (radio frequency/intermediate frequency) module. And, the terminal can include means, modules, parts and/or the like for performing a controller function for performing the above-described embodiments of the present invention, a MAC (medium access control) frame variable control function according to a service characteristic and electric wave environment, a handover function, an authentication and encryption function, a packet modulation/demodulation function for data transmission, a fast packet channel coding function, a real-time modem control function, and the like.

A base station is able to transmit data received from an upper layer to a terminal. The base station can include a low-power RF/IF (radio frequency/intermediate frequency) module. And, the base station can include means, modules, parts and/or the like for performing a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like.

INDUSTRIAL APPLICABILITY

Accordingly, the present invention is applicable to various wireless access systems. And, 3GPP ($3^{rd}$ generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for efficiently paging a terminal of an idle mode, the method comprising:
    allocating an identifier of a large paging group and an identifier of a specific one of small paging groups included in the large paging group to a broadcast channel region;
    transmitting a header including the broadcast channel region to the terminal;
    paging the terminal by using the identifier of the specific one of small paging groups; and
    paging the terminal by using the identifier of a large paging group when the terminal has performed a pre-determined number of location updates.

2. The method of claim 1, wherein the broadcast channel region includes a primary broadcast channel (PBCH) having network common information allocated thereto and a secondary broadcast channel (SBCH) having cell specific information allocated thereto.

3. The method of claim 2, wherein the large paging group paging information is allocated to the primary broadcast channel and wherein the small paging group paging information is allocated to the secondary broadcast channel.

4. The method of claim 2, wherein if a plurality of large paging groups exist on a prescribed network, at least one of the large paging group identifier and the small paging group identifier is allocated to the secondary broadcast channel.

5. The method of claim 4, wherein at least one of a large paging indicator and a small paging indicator is further allocated to the secondary broadcast channel.

6. The method of claim 1, wherein the broadcast channel region comprises a first region using a single frequency network (SFN) and a second region including cell specific information.

7. The method of claim 6, wherein the first region includes the large paging group identifier and wherein the second region includes the small paging group identifier.

8. The method of claim 7, wherein the second region further comprises a paging group change flag indicating a paging group change of the terminal.

9. The method of claim 1, further comprising the step of receiving a ranging request message including an identifier of the specific small paging group from the terminal,
wherein the ranging request message is transmitted for a location update.

10. The method of claim 1, wherein the header is a superframe header.

11. A method of efficiently paging for a mobile station in idle mode, the method comprising:
receiving a header including a broadcast channel region including an identifier of a large paging group and an identifier of a specific one of small paging groups included in the large paging group;
transmitting a message including the identifier of the specific small paging group; and
performing a location update when the mobile station is moved to a region corresponding to a different small paging group among the small paging groups from a region corresponding to the specific small paging group;
wherein if the mobile station has performed a pre-determined number of location updates within the large paging group, the mobile station performs a next location update when the large paging group changes.

12. The method of claim 11, wherein the broadcast channel region includes a primary broadcast channel (PBCH) to which information used in common for the large paging group is allocated and a secondary broadcast channel (SBCH) to which information used for a prescribed cell in the large paging group is allocated.

13. The method of claim 12, wherein the large paging group paging information is allocated to the primary broadcast channel and wherein the small paging group paging information is allocated to the secondary broadcast channel.

14. The method of claim 12, wherein if a plurality of large paging groups exist on a prescribed network, at least one of the large paging group identifier and the small paging group identifier is allocated to the secondary broadcast channel.

15. The method of claim 14, wherein at least one of a large paging indicator and a small paging indicator is further allocated to the secondary broadcast channel.

16. The method of claim 11, wherein the broadcast channel region comprises a first region using a single frequency network (SFN) and a second region including cell specific information.

17. The method of claim 16, wherein the first region includes the large paging group identifier and wherein the second region includes the small paging group identifier.

18. The method of claim 17, wherein the second region further comprises a paging group change flag indicating a paging group change of a terminal.

19. The method of claim 11, wherein the header is a superframe header.

20. The method of claim 11, wherein the message is a ranging message and wherein the ranging message is transmitted for a terminal to perform a location update.

* * * * *